United States Patent
Wang et al.

(10) Patent No.: US 11,340,825 B1
(45) Date of Patent: May 24, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Yi Wang, Chengdu (CN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/184,021

(22) Filed: Feb. 24, 2021

(30) Foreign Application Priority Data

Jan. 21, 2021 (CN) .......................... 202110081641.4

(51) Int. Cl.
*G06F 3/06* (2006.01)

(52) U.S. Cl.
CPC .............. *G06F 3/065* (2013.01); *G06F 3/064* (2013.01); *G06F 3/0619* (2013.01); *G06F 3/0647* (2013.01)

(58) Field of Classification Search
None
See application file for complete search history.

(56) References Cited

U.S. PATENT DOCUMENTS

| 2008/0104343 A1* | 5/2008 | Miyagaki | G06F 3/0625 711/158 |
| 2015/0302026 A1* | 10/2015 | Nam | G06F 16/119 707/827 |

* cited by examiner

*Primary Examiner* — Michael Alsip
(74) *Attorney, Agent, or Firm* — Womble Bond Dickinson (US) LLP (57) ABSTRACT

Embodiments of the present disclosure relate to a method, a device, and a computer program product for managing a storage system. The method for managing a storage system includes: in response to migration of data from a source storage system to a target storage system, if it is determined that a target client terminal that uses the source storage system to back up data generates data to be backed up, determining whether the amount of data stored in the target storage system for the target client terminal exceeds a threshold; and if it is determined that the amount of data exceeds the threshold, storing the data to be backed up into the target storage system. According to the embodiments of the present disclosure, the data to be backed up can be stored into the target storage system before data of a source storage device is completely migrated to a target storage device. In this way, the performance of the storage system can be improved, and the time required to migrate the data of the source storage device to the target storage device can be reduced.

20 Claims, 8 Drawing Sheets

METHOD, DEVICE, AND COMPUTER PROGRAM PRODUCT FOR MANAGING STORAGE SYSTEM

CROSS-REFERENCE TO RELATED APPLICATION

This patent application claims priority, under 35 U.S.C. § 119, of Chinese Patent Application No. 202110081641.4, filed Jan. 21, 2021, which is incorporated by reference in its entirety.

TECHNICAL FIELD

Embodiments of the present disclosure generally relate to the field of data storage, and in particular, to a method, a device, and a computer program product for managing a backup storage system.

BACKGROUND

With the development and progress of data storage technologies, storage systems continue to undergo upgrades. When a user chooses to use a new storage system to replace an old storage system, it is usually necessary to migrate and store backup data stored in the old storage system to the new storage system. In this way, the user can retain their original stored backup data in the new storage system. As more and more users choose to use a new storage system for data backup, how to migrate backup data in an old storage system to the new storage system more effectively is an issue worthy of attention.

SUMMARY OF THE INVENTION

Embodiments of the present disclosure provide a method, a device, and a computer program product for managing a storage system.

In a first aspect of the present disclosure, a method for managing a storage system is provided. The method includes: in response to migration of data from a source storage system to a target storage system, if it is determined that a target client terminal that uses the source storage system to back up data generates data to be backed up, determining whether the amount of data stored in the target storage system for the target client terminal exceeds a threshold; and if it is determined that the amount of data exceeds the threshold, storing the data to be backed up into the target storage system.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: in response to migration of data from a source storage system to a target storage system, if it is determined that a target client terminal that uses the source storage system to back up data generates data to be backed up, determining whether the amount of data stored in the target storage system for the target client terminal exceeds a threshold; and if it is determined that the amount of data exceeds the threshold, storing the data to be backed up into the target storage system.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention section is provided to introduce the selection of concepts in a simplified form, which will be further described in the Detailed Description below. The Summary of the Invention section is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the drawings, identical or corresponding reference numerals represent identical or corresponding parts.

DETAILED DESCRIPTION

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second," and the like may refer to different or identical objects. Other explicit and implicit definitions may also be included below.

Figure 1:
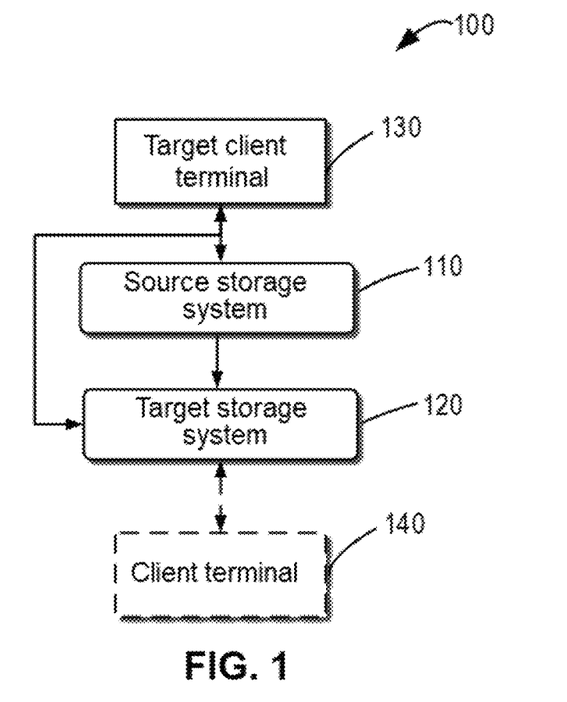
FIG. 1 shows a block diagram of an example environment in which embodiments of the present disclosure can be implemented.

FIG. 1 shows a schematic diagram of storage environment 100 in which the embodiments of the present disclosure may be implemented. Storage environment 100 includes source storage system 110 (i.e., an old storage system), target storage system 120 (i.e., a new storage system), and target client terminal 130. It should be understood that although only one target client terminal 130 is shown in FIG. 1, this is only illustrative, and storage environment 100 may include a plurality of target client terminals 130. Source storage system 110 is an old storage system originally used by a user, in which backed-up data of target client terminal 130 is stored. Target storage system 120 is a new storage system that the user is to use.

Source storage system 110 and target client terminal 130, as well as target storage system 120 and target client terminal 130, may communicate with each other through various communication protocols. Source storage system 110 may transmit data to target storage system 120 through various communication protocols. In some embodiments, storage environment 100 further includes client terminal 140 that communicates with target storage system 120. Client terminal 140 may not communicate with source storage system 110.

Source storage system 110 and target storage system 120 may utilize multiple storage technologies to provide data storage capabilities. In some embodiments, example storage forms of source storage system 110 and target storage system 120 may include, but are not limited to, a digital versatile disk (DVD), a blue-ray disc (BD), a compact disk (CD), a floppy disk, a hard disk device, a tape drive, an optical drive, a hard disk device drive (HDD), a solid storage device (SSD), a redundant array of independent disks (RAID), or other hard disk devices.

When the user wants to use target storage system 120 to replace source storage system 110, the user needs to migrate and store the backed-up data of target client terminal 130 stored in source storage system 110 to target storage system 120 so that the user's data can be retained in target storage system 120.

In conventional solutions, since a large amount of data is stored in the old storage system, it takes a lot of time to migrate and store backed-up data stored in the old storage system to the new storage system. In particular, for scenarios where the old storage system and the new storage system use different data structures and different deduplication algorithms, it is necessary to restore the deduplicated data in the old storage system. In addition, it is necessary to use algorithms and data structures of the new storage system to create new backup data for use by the new storage system. In this case, the migration process will take a long time.

Figure 2:
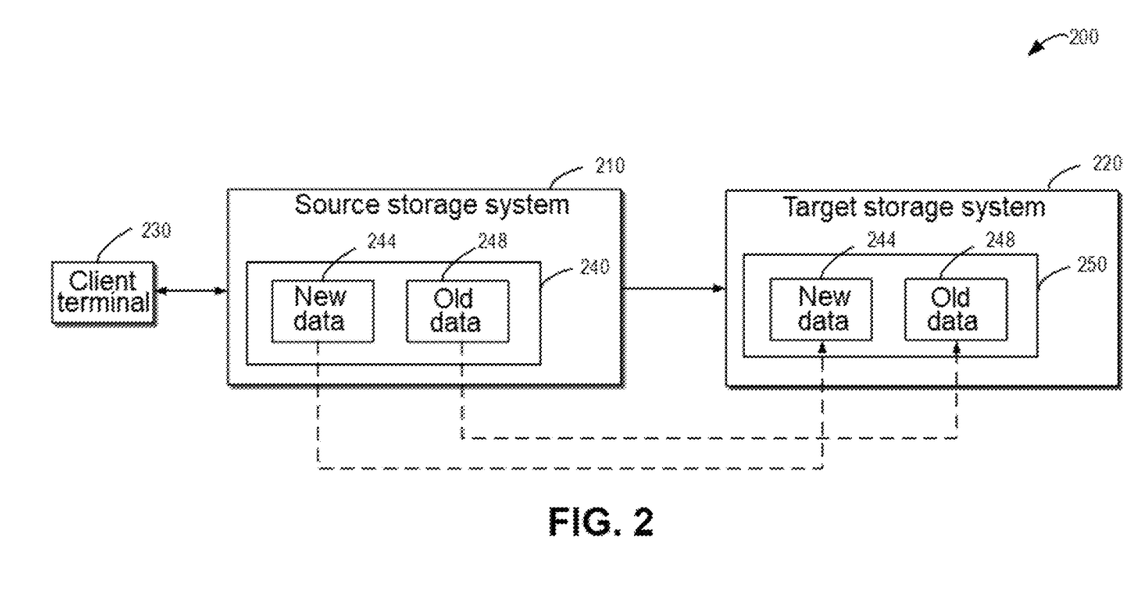
FIG. 2 shows a schematic diagram of a conventional solution for migrating backup data from an old storage system to a new storage system.

FIG. 2 shows a schematic diagram of conventional solution 200 for migrating backup data from an old storage system to a new storage system. As shown in FIG. 2, in the process of migrating the backup data from source storage system 210 to target storage system 220, client terminal 230 that uses source storage system 210 to back up data is still generating new data 244 to be backed up. In a migration process of a conventional solution, backed-up old data 248 stored in source storage system 210 is stored from source storage system 210 to target storage system 220. In addition, new data 244 to be backed up generated by client terminal 230 also needs to be stored.

In actual use, new data 244 to be backed up generated by client terminal 230 is not directly stored in target storage system 220. This is because existing backup data is not stored in target storage system 220, and the process of storing new data 244 into target storage system 220 will be very slow. Therefore, in the conventional solution, new data 244 to be backed up is first stored in source storage system 210, and then new data 244 is stored from source storage system 210 to target storage system 220.

In actual use, the conventional solution described above first stores new data 244 to be backed up generated by client terminal 230 into source storage system 210, and then stores it from source storage system 210 to target storage system 220. This solution needs to take a lot of extra time to migrate new data 244, thus affecting the performance of the entire system. In addition, because it takes a lot of time, the waiting time of the user is often too long, which may easily cause dissatisfaction of the user and trouble the user.

The embodiments of the present disclosure provides a solution for managing a storage system to solve one or more of the above problems and other potential problems. In the solution, in a process of migrating backed-up data stored in a source storage system to a target storage system, it is determined whether a target client terminal that uses the source storage system to back up data generates new data to be backed up. If it is determined that the target client terminal generates the data to be backed up, it is determined whether the target storage system stores an amount of data exceeding a threshold for the target client terminal. If it is determined that the amount of data exceeding the threshold is stored in the target storage system, the data to be backed up is stored into the target storage system without being stored into the source storage system.

In this way, it is possible in the backup data migration process to avoid storing all the data to be backed up generated by the target client terminal into the source storage system, and then storing it from the source storage system to the target storage system. In this way, the total time of the backup data migration process can be reduced. In this way, the performance of the storage system can be improved, and data can be backed up more effectively.

Figure 3:
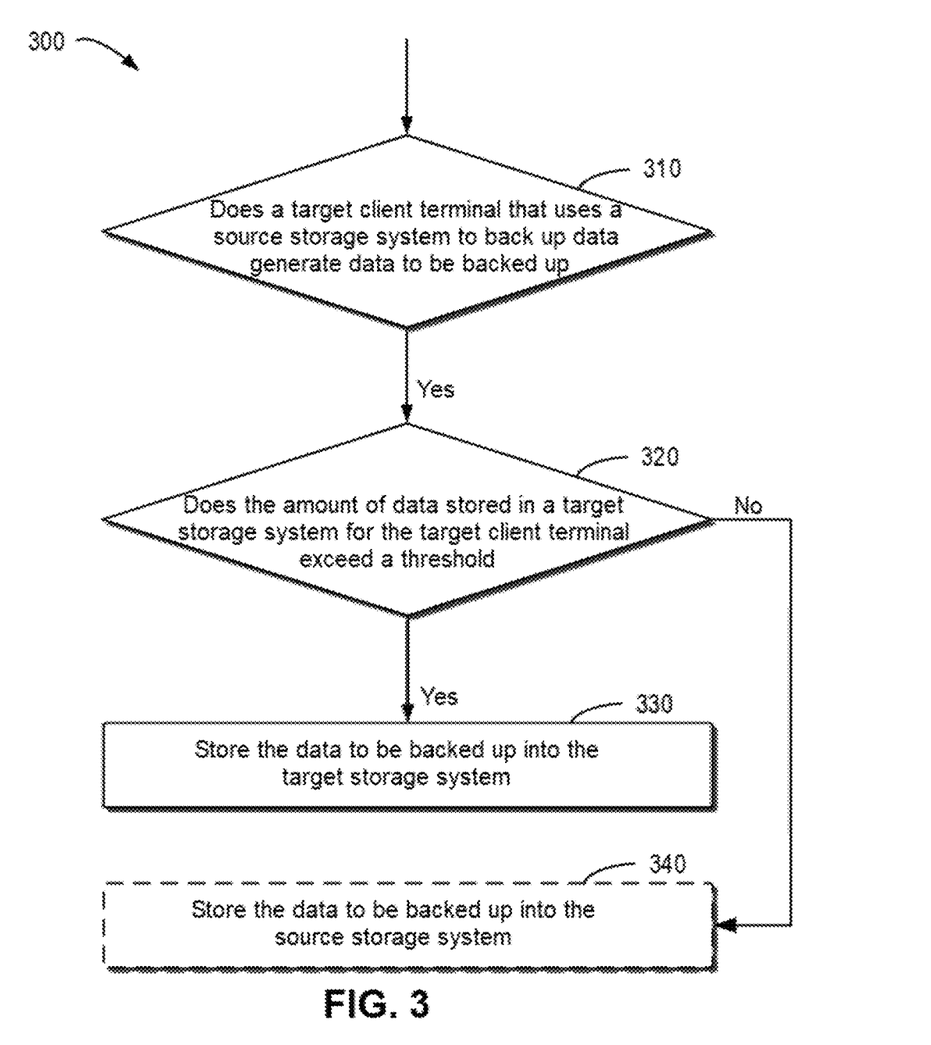
FIG. 3 shows a flow chart of an example method for storing data to be backed up in a backup data migration process according to some embodiments of the present disclosure.

The embodiments of the present disclosure will be described in detail below with reference to the accompanying drawings. FIG. 3 shows a flow chart of example method 300 for managing storage system 100 according to some embodiments of the present disclosure. Method 300 may be performed, for example, by storage environment 100 as shown in FIG. 1. It should be understood that method 300 may further include additional actions not shown and/or may omit actions shown. The scope of the present disclosure is not limited in this aspect. Method 300 is described in detail below with reference to FIG. 1.

As shown in FIG. 3, at 310, it is determined whether target client terminal 130 generates data to be backed up, and target client terminal 130 is a client terminal that uses source storage system 110 to perform data backup. For example, whether target client terminal 130 outputs new data to be backed up is determined. If it is determined at 310 that target client terminal 130 generates data to be backed up, method 300 proceeds to 320.

At 320, it is determined whether the amount of data stored in target storage system 120 for target client terminal 130 exceeds a threshold. For example, in some embodiments, it can be determined whether the amount of data for target client terminal 130 in the backup data that has been stored in target storage system 120 already exceeds a threshold (for example, 80% of the backed-up data stored by target client terminal 130 in source storage system 110). It should be understood that, in some embodiments, the threshold may be any percentage value of the backed-up data stored by target client terminal 130 in source storage system 110.

If it is determined at 320 that the amount of data stored in target storage system 120 for target client terminal 130 exceeds the threshold, method 300 proceeds to 330. At 330, the data to be backed up is stored into target storage system 120. For example, the data to be backed up generated by target client terminal 130 can be directly stored into target storage system 120 without being stored into source storage system 110.

Alternatively or additionally, if it is determined at 320 that the amount of data stored in target storage system 120 for target client terminal 130 is lower than the threshold, method 300 may proceed to 340. At 340, the data to be backed up generated by target client terminal 130 may be stored into source storage system 110 instead of being directly stored into target storage system 120.

It can be seen from the above description that, with the solution of managing a storage system proposed here, it is possible to avoid storing all the data to be backed up generated by target client terminal 130 into source storage system 110, and then storing it from source storage system 120 to target storage system 110. Through the above solution, after the data, exceeding the threshold, of target client terminal 130 has been stored into target storage system 120, the data to be backed up generated by target client terminal 130 can be directly stored into target storage system 120 without being stored into source storage system 110. In this way, the time for data migration between source storage system 110 and target storage system 120 can be greatly reduced, and the entire backup data migration process can be completed more quickly. In this way, the performance of the storage system can be improved, and the data can be backed up more effectively.

Example method 300 for storing the data to be backed up generated by target client terminal 130 according to some embodiments of the present disclosure is described above with reference to FIG. 3. In some embodiments, example method 400 described with reference to a flow chart of FIG. 4 may also be used to migrate the backed-up data of target client terminal 130. Method 400 may be performed, for example, by storage environment 100 as shown in FIG. 1. It should be understood that method 400 may further include additional actions not shown and/or may omit actions shown. The scope of the present disclosure is not limited in this aspect. Method 400 is described in detail below with reference to FIG. 1.

Figure 4:
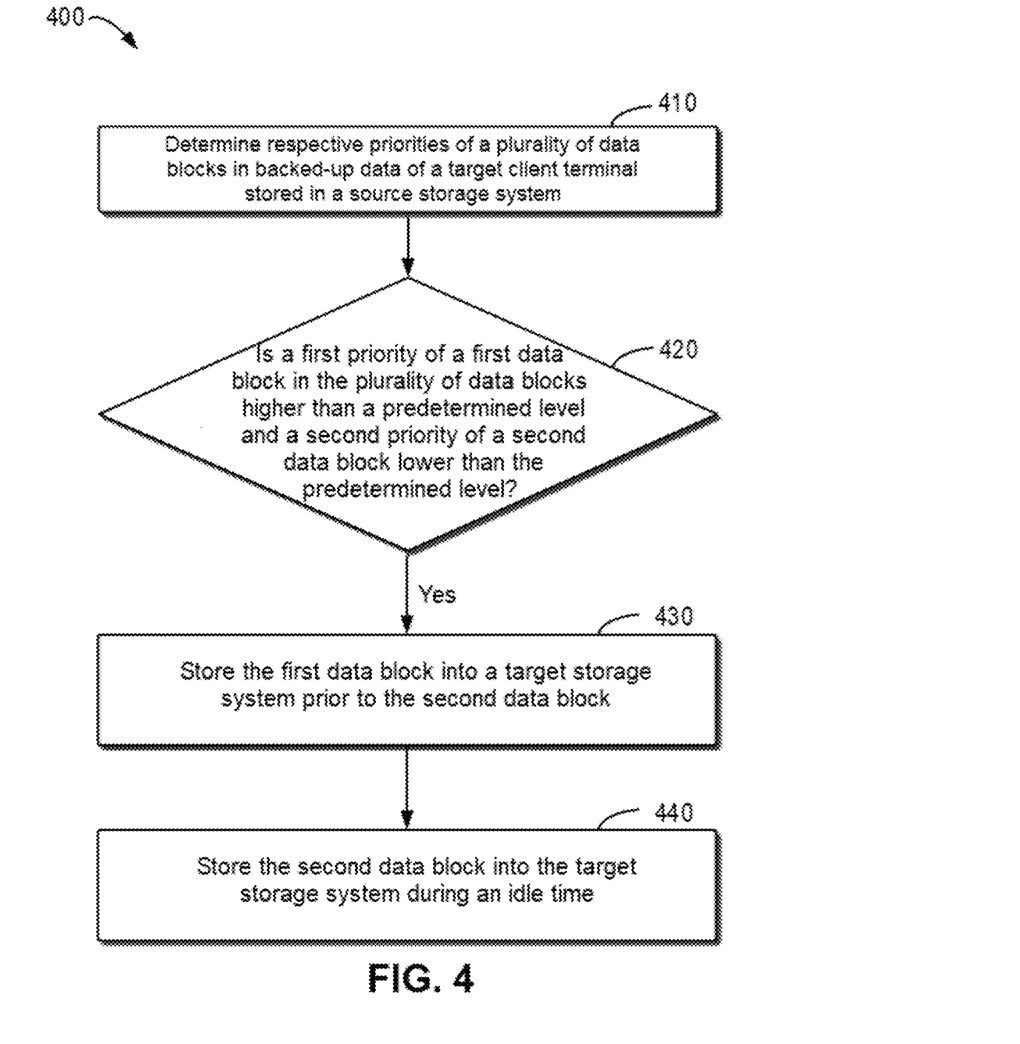
FIG. 4 shows a flow chart of an example method for migrating backed-up data of a client terminal according to some embodiments of the present disclosure.

As shown in FIG. 4, at 410, respective priorities of a plurality of pieces of backup data (also referred to as "a plurality of data blocks" herein) in backed-up data of target client terminal 130 stored in source storage system 110 may be determined based on target historical backup information related to target client terminal 130 in source storage system 110. It should be understood that although "data block" is used herein to refer to "backup data," this is only illustrative and does not limit the present invention in any way. For example, in some embodiments, the priorities of the plurality of data blocks may be determined based on respective repetition rates of the plurality of data blocks in source storage system 110 from high to low. The repetition rates are indicated by the target historical backup information related to target client terminal 130 stored in source storage system 110. The data block with the highest repetition rate is determined to have the highest priority, and the data block with the lowest repetition rate is determined to have the lowest priority.

Alternatively or additionally, in some embodiments, the priorities of the plurality of data blocks may also be determined based on respective repetition rates of the plurality of data blocks in source storage system 110 from high to low and respective time periods in which the data blocks are repeatedly stored from short to long. The repetition rates and the time periods are indicated by the target historical backup information related to target client terminal 130 stored in source storage system 110. First, the respective priorities are determined based on the respective repetition rates of the plurality of data blocks in source storage system 110 from high to low, and the data block with the highest repetition rate is determined to have the highest priority. Second, for some data blocks with similar repetition rates, their priorities are determined based on their respective time periods. A data block with a shorter time period has a higher priority, and a data block with a longer time period has a lower priority.

At 420, it may be determined whether a first priority of a first data block in the plurality of data blocks is higher than a predetermined level, and a second priority of a second data block is lower than the predetermined level. It should be understood that the predetermined level may be any priority level. In some embodiments, the predetermined level may be associated with the threshold in method 300. When the threshold in method 300 is set as a higher value, such as 80%, the predetermined level is a lower level, and there are more data blocks higher than the predetermined level. When the threshold in method 300 is set as a lower value, such as 50%, the predetermined level is a higher level, and there are fewer data blocks higher than the predetermined level. It should be understood that the numerical values described here are only illustrative and not intended to limit the scope of the present disclosure. Different threshold values can be set according to specific application scenarios.

If it is determined at 420 that the first priority of the first data block is higher than the predetermined level and the second priority of the second data block is lower than the predetermined level, method 400 proceeds to 430. At 430, the first data block may be stored into target storage system 120 prior to the second data block. For example, the first data block may be stored into target storage system 120 at the current time, but the second data block may not be stored into target storage system 120 at the current time.

At 440, the second data block may be stored into target storage system 120 during an idle time. For example, the second data block may be stored into target storage system 120 during the idle time after the data blocks of target client terminal 130 with priorities higher than the predetermined level are all moved to target storage system 120.

In this way, the backup data with a high repetition rate and a high frequency of repetitive storage can be preferentially stored into target storage system 120, thereby ensuring that target storage system 120 can store the amount of data meeting the threshold in less time. Target storage system 120 stores the amount of data meeting the threshold in less time, so that the data to be backed up generated by target client terminal 130 can be directly stored into target storage system 120 earlier. In this way, the time spent on backup data migration is reduced, and the performance of the storage system is improved.

Although only one target client terminal 130 is shown in the backup data migration process according to some embodiments described above with reference to FIGS. 3-4, in some embodiments, source storage system 110 may have a plurality of client terminals, and backup data of the plurality of client terminals need to be stored from source storage system 110 into target storage system 120. Such embodiment will be described in detail below with reference to FIGS. 5-6.

Figure 5:
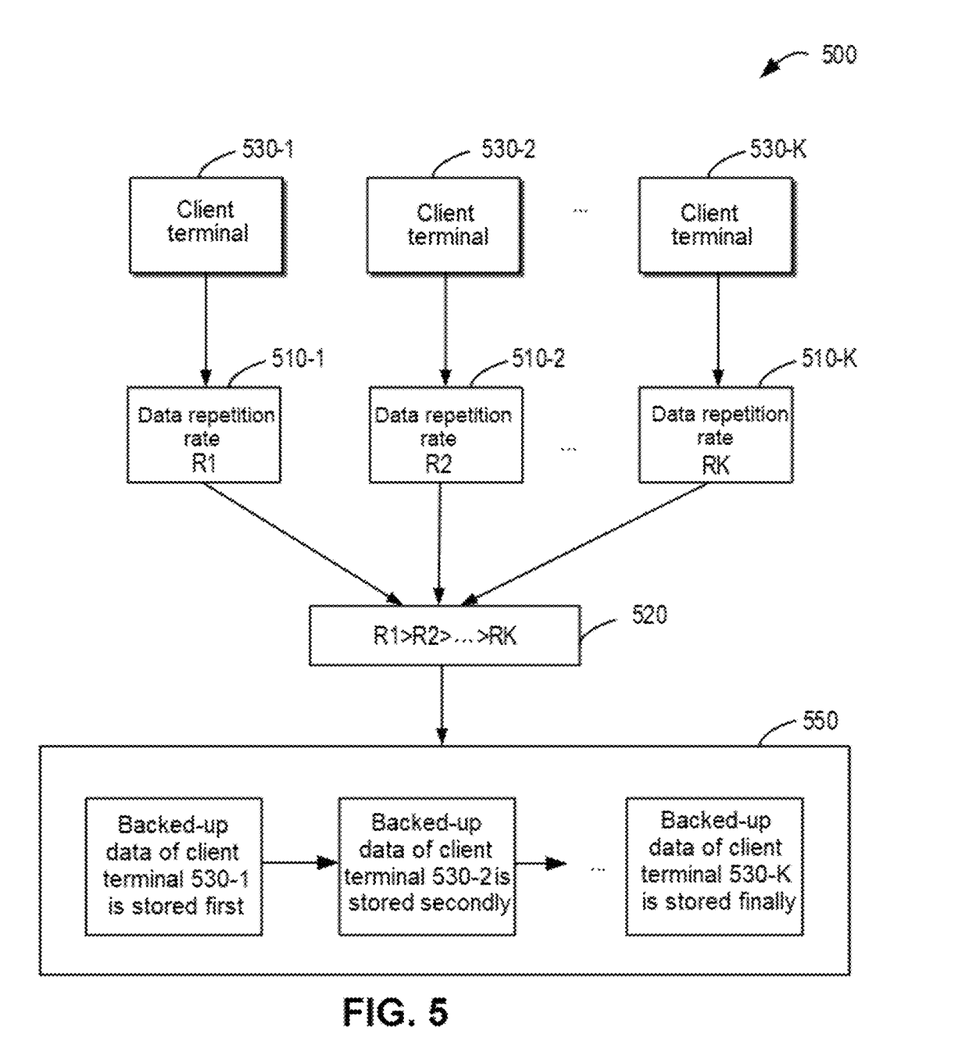
FIG. 5 shows a flow chart of an example method for sorting a plurality of client terminals of an old storage system according to some embodiments of the present disclosure.

As shown in FIG. 5, source storage system 110 may store backup data for a plurality of client terminals 530-1, 530-2, . . . , 530-K (collectively or individually referred to as "client terminal 530"). When a user uses target storage system 120 to replace source storage system 110, backup data stored in source storage system 110 for each client terminal 530 in the plurality of client terminals 530 needs to be stored into target storage system 120 to ensure the integrity of the backup data.

In some embodiments, the plurality of client terminals 530 may be sorted based on respective data repetition rates of the plurality of client terminals 530 in source storage system 110. In some embodiments, the backed-up data for the plurality of client terminals 530 in source storage system 110 may further be stored into target storage system 120 in sequence based on the sorting.

As shown in FIG. 5, in some embodiments, the plurality of client terminals 530 are sorted based on the respective data repetition rates of the plurality of client terminals 530 in source storage system 110. For example, respective data repetition rates 510-1, 510-2, . . . , 510-K (collectively or individually referred to as "data repetition rate 510") of the plurality of client terminals 530 may be determined based on respective historical backup information stored in source storage system 110 for the plurality of client terminals 530. FIG. 5 shows K client terminals 530, wherein K may be any natural number. For example, K may be 6, but this is only illustrative and does not limit the present invention in any way. The plurality of client terminals 530 are sorted based on respective data repetition rates 510 of the plurality of client terminals 530 from high to low. For example, as shown in FIG. 5, order 520 of data repetition rates 510 from high to low is R1>R2> . . . >RK. Based on this order, the plurality of client terminals 530 can be sorted to obtain sorting result 550.

According to sorting result 550, the backed-up data of client terminal 530-1 with highest data repetition rate 510-1 is stored from source storage system 110 to target storage system 120 first. Secondly, the backed-up data of client terminal 530-2 with second-highest data repetition rate 510-2 is stored from source storage system 110 to target storage system 120. Finally, the backed-up data of client terminal 530-K with lowest data repetition rate 510-K is stored into target storage system 120.

It should be understood that the process of storing the backed-up data of client terminal 530 into target storage system 120 described above may use the process described in method 400. Alternatively or additionally, the process of storing the backed-up data of client terminal 530 into target storage system 120 described above may also use processes described in other methods.

In some embodiments, a predetermined number of recently stored data blocks of client terminal 530-1 stored in source storage system 110 may be stored into target storage system 120 first, and the remaining data blocks of client terminal 530-1 stored in source storage system 110 may not be stored into target storage system 120 temporarily. Subsequently, a predetermined number of recently stored data blocks of client terminal 530-2 in source storage system 110 are stored into target storage system 120. Finally, a predetermined number of recently stored data blocks of client terminal 530-K in source storage system 110 are stored into target storage system 120. After the respective predetermined number of recently stored data blocks of client terminals 530 in source storage system 110 are stored into target storage system 120, respective remaining data blocks of client terminals 530 may be stored into target storage system 120 during an idle time.

In this way, it can be ensured that the backup data of client terminal 530 with a high data repetition rate is preferentially stored into target storage system 120. Then, it can be ensured that the amount of data meeting the threshold is stored into target storage system 120 in a short time, so that the data to be backed up newly generated by client terminal 530 can be directly stored into target storage system 120 in a short time.

Figure 6:
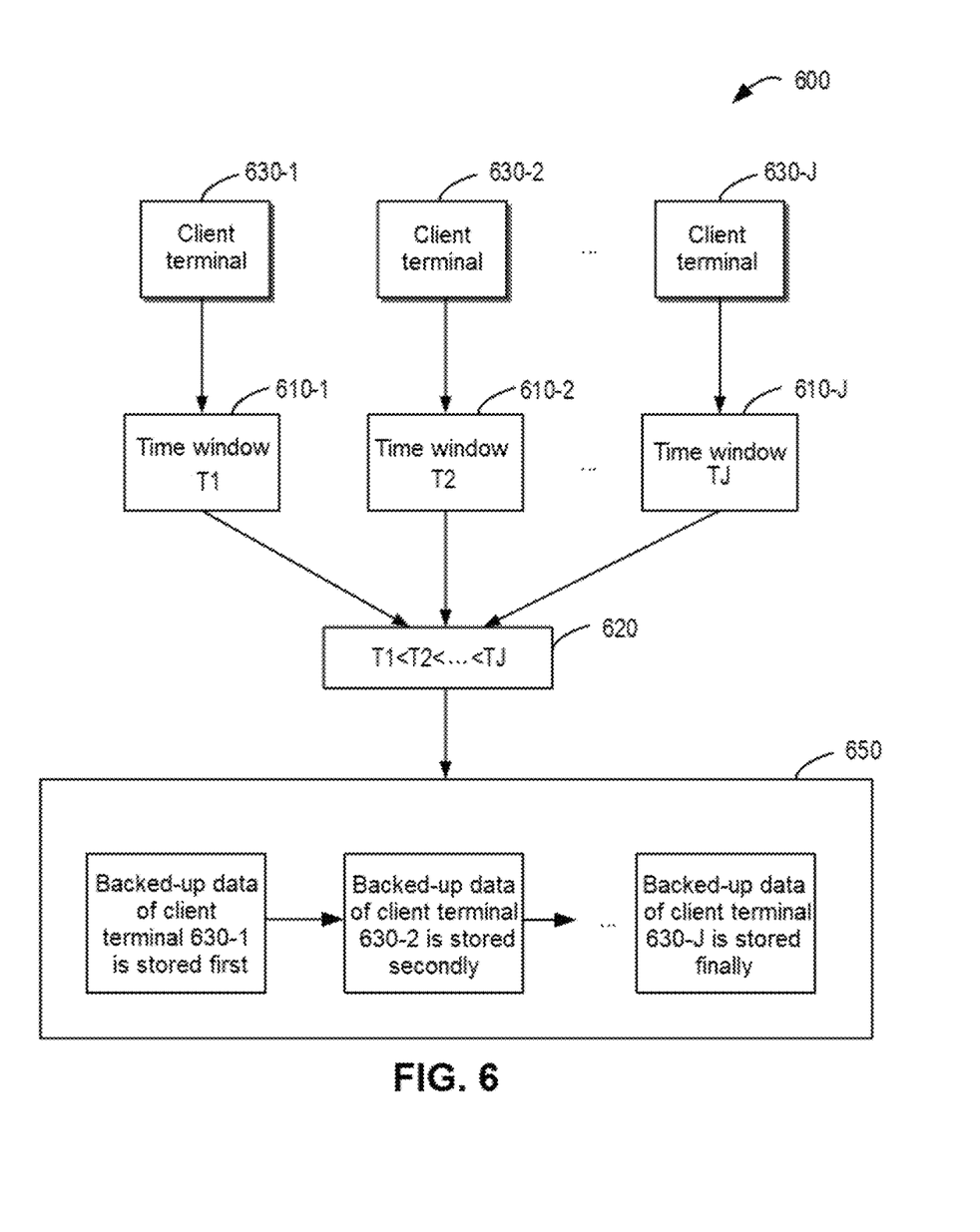
FIG. 6 shows a schematic diagram of another example method for sorting a plurality of client terminals of an old storage system according to some embodiments of the present disclosure.

In some embodiments, as shown in FIG. 6, some client terminals 630-1, 630-2, . . . , 630-J (collectively or individually referred to as "client terminal 630," and J can be any natural number) in source storage system 110 have basically the same data repetition rate. For example, the data repetition rate of each other does not differ by more than 5%. Again, this numerical value is only illustrative. These client terminals 630 with substantially the same data repetition rate can be further sorted based on their respective time windows. The respective time windows of the plurality of client terminals 630 indicate frequencies at which the plurality of client terminals 630 back up data in source storage system 110 respectively. The shorter the time window, the higher the frequency at which data is backed up. The respective time windows may be indicated by respective historical backup information stored in source storage system 110.

For example, the plurality of client terminals 630-1, 630-2, . . . , 630-J with substantially the same data repetition rate are first sorted in the same order in advance. Subsequently, the respective time windows 610-1, 610-2, . . . , 610-J (collectively or individually referred to as "time window 610") of the plurality of client terminals 630 can be determined based on the respective historical backup information stored in source storage system 110 for the plurality of client terminals 630. The plurality of client terminals 630 are sorted based on respective time windows 610 of the plurality of client terminals 630 from small to large. For example, as shown in FIG. 6, sequence 620 of time windows 610 from high to low is T1<T2< . . . <TJ. Based on this sequence, the plurality of client terminals 630 can be sorted to obtain sorting result 650.

According to sorting result 650, the backed-up data of client terminal 630-1 with smallest time window 610-1 is stored from source storage system 110 to target storage system 120 first. Secondly, the backed-up data of client terminal 630-2 with second-smallest time window 610-2 is stored from source storage system 110 to target storage system 120. Finally, the backed-up data of client terminal 630-J with largest time window 610-J is stored into target storage system 120.

It should be understood that the process of storing the backed-up data of client terminal 630 into target storage system 120 described above may use the process described in method 400. Alternatively or additionally, the process of storing the backed-up data of client terminal 630 into target storage system 120 described above may also use processes described in other methods, for example, the process described above with reference to FIG. 5.

In some embodiments, a predetermined number of recently stored data blocks of client terminal 630-1 stored in source storage system 110 may be stored into target storage system 120 first, and the remaining data blocks of client terminal 630-1 stored in source storage system 110 may not be stored into target storage system 120 temporarily. Subsequently, a predetermined number of recently stored data blocks of client terminal 630-2 in source storage system 110 are stored into target storage system 120. Finally, a predetermined number of recently stored data blocks of client terminal 630-J in source storage system 110 are stored into target storage system 120. After the respective predetermined number of recently stored data blocks of client terminals 630 in source storage system 110 are stored into target storage system 120, respective remaining data blocks of client terminals 630 may be stored into target storage system 120 during an idle time.

In this way, client terminals 630 with similar data repetition rates can be further sorted according to their data backup frequencies, to ensure that the backup data with a high backup frequency is preferentially stored into target storage system 120. Then, it can be ensured that the data to be backed up newly generated by client terminal 630 can be directly stored into target storage system 120 in a short time, thereby further reducing the time spent on migration from source storage system 110 to target storage system 120. Through the above method, the process of migration from source storage system 110 to target storage system 120 is accelerated. In this way, the user can start using target storage system 120 as early as possible, so that the experience of the user will not be affected due to a long data migration process.

Figure 7:
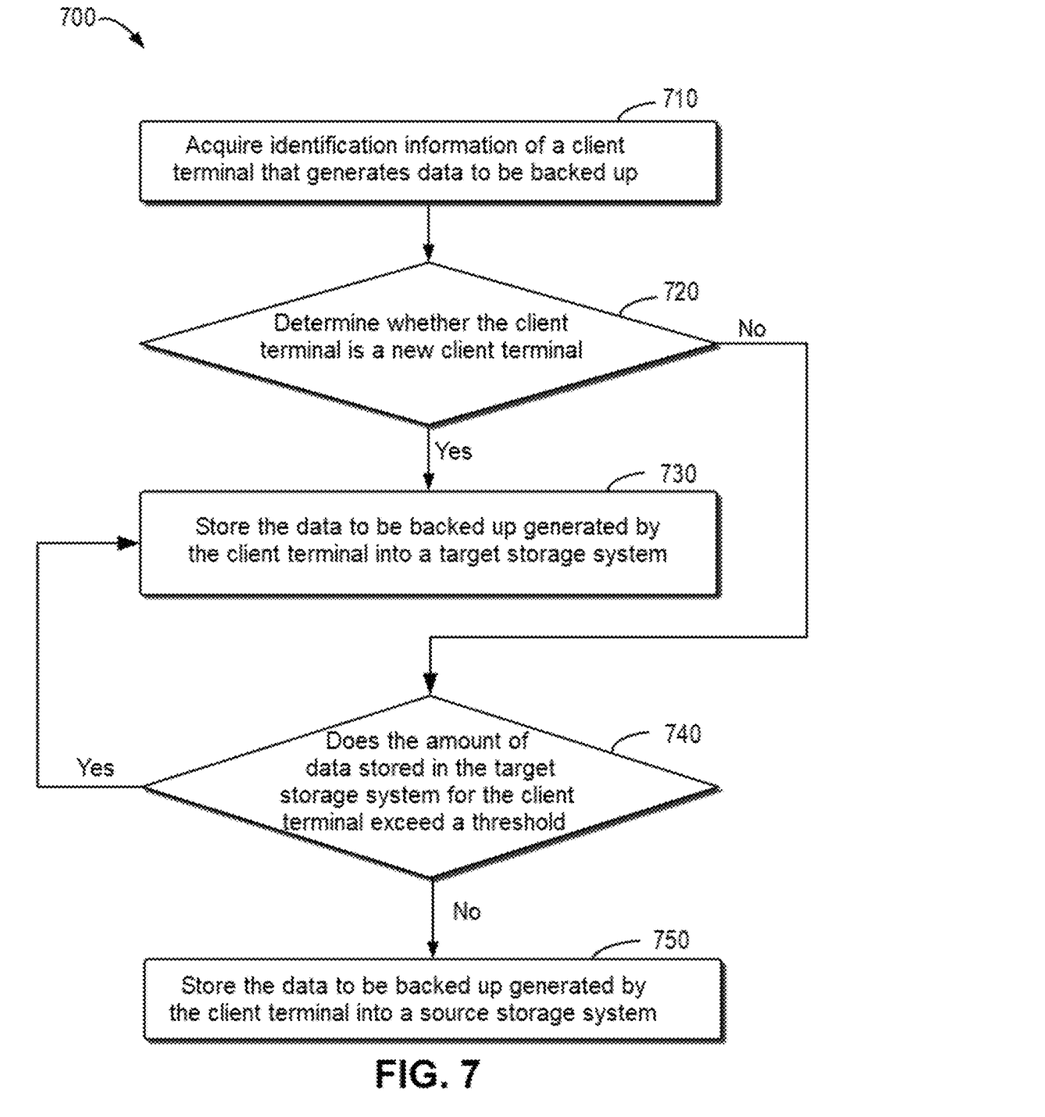
FIG. 7 shows a flow chart of an example method for storing data to be backed up in a backup data migration process according to some embodiments of the present disclosure.

Example method 300 for storing data to be backed up of target client terminal 130 that uses source storage system 110 to back up data according to some embodiments of the present disclosure is shown above with reference to FIG. 3. In the usage process, some new client terminals 140 may be added to storage environment 100, and the data to be backed up generated by client terminals 140 also needs to be stored. In view of this situation, FIG. 7 shows a flow chart of example method 700 for storing data to be backed up in a backup data migration process according to some embodiments of the present disclosure. Method 700 is described below with reference to FIG. 1.

At 710, identification information of a client terminal, such as a client terminal label of the client terminal, that generates new data to be backed up may be obtained. The client terminal generating the data to be backed up may be target client terminal 130 that uses source storage system 110 to back up data, or client terminal 140 that does not use source storage system 110 to back up data. Client terminal 140 may only communicate with target storage system 120 and not communicate with source storage system 110.

At 720, whether the client terminal is new client terminal 140 is determined based on the identification information. For example, whether the client terminal is client terminal 140 can be determined by determining whether the identification information (such as the client terminal label) of the client terminal is stored in source storage system 110. If the identification information of the client terminal is not stored in source storage system 110, the client terminal is new client terminal 140. Conversely, if the identification information of the client terminal is stored in source storage system 110, the client terminal is target client terminal 130 that uses source storage system 110 to back up data, rather than new client terminal 140.

If it is determined at 720 that it is new client terminal 140, method 700 proceeds to 730. At 730, the data to be backed up generated by client terminal 140 may be stored into target storage system 120, without being stored into source storage system 110. In this way, the data to be backed up of new client terminal 140 can be directly stored by using target storage system 120. In this way, there is no need to first store the data to be backed up of client terminal 140 into source storage system 110 and then store it from source storage system 110 to target storage system 120. Thus, the time spent on migration from source storage system 110 to target storage system 120 can be reduced.

If it is determined at 720 that the client terminal is not a new client terminal (that is, it is target client terminal 130 using source storage system 110 in storage environment 100), method 700 proceeds to 740. At 740, similar to 320 of method 300, it is determined whether the amount of data stored in target storage system 120 for target client terminal 130 exceeds a threshold. For example, in some embodiments, the threshold may be 80% of the backed-up data stored by target client terminal 130 in source storage system 110.

If it is determined at 740 that the amount of data stored in target storage system 120 for target client terminal 130 exceeds the threshold, method 700 proceeds to 730. At 730, the data to be backed up is stored into target storage system 120. For example, the data to be backed up generated by target client terminal 130 can be directly stored into target storage system 120 without being stored into source storage system 110.

If it is determined at 740 that the amount of data stored in target storage system 120 for target client terminal 130 is lower than the threshold, method 700 may proceed to 750. At 750, the data to be backed up generated by target client terminal 130 may be stored into source storage system 110.

It can be seen from the above description that, by utilizing the storage system management solution proposed here, the data to be backed up of new client terminal 140 can be directly stored by using target storage system 120. In addition, it is possible to avoid storing all the data to be backed up generated by client terminal 140 into source storage system 110 and then moving it from source storage system 110 to target storage system 120.

Through the above solution, after the data exceeding the threshold has been stored into target storage system 120 for target client terminal 130, the data to be backed up generated by target client terminal 130 can be directly stored into target storage system 120 without being stored into source storage system 110. In this way, the time for data migration between the storage systems can be greatly reduced, such that the performance of the storage system meets the requirements of a service level agreement (SLA).

In addition, since the time for data migration between the storage systems is greatly reduced, users can start using target storage system 120 as early as possible. In this way, the time for users to wait for a long system migration is avoided, and the user experience is improved.

Figure 8:
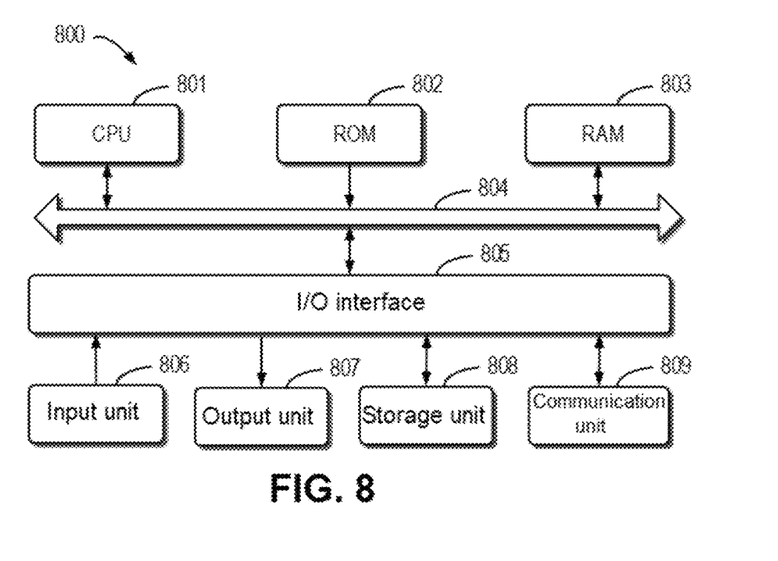
FIG. 8 shows a schematic block diagram of an example device that can be configured to implement the present disclosure.

FIG. 8 shows a schematic block diagram of example device 800 that may be configured to implement an embodiment of the present disclosure. For example, storage environment 100 as shown in FIG. 1 may be implemented by device 800. As shown in FIG. 8, device 800 includes central processing unit (CPU) 801 that can perform various appropriate actions and processing according to computer program instructions stored in read-only memory (ROM) 802 or computer program instructions loaded from storage unit 808 to random access memory (RAM) 803. RAM 803 may further store various programs and data required for operations of device 800. CPU 801, ROM 802, and RAM 803 are connected with each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, such as methods 300, 400, and/or 700, may be performed by processing unit 801. For example, in some embodiments, methods 300, 400, and/or 700 may be implemented as a computer software program that is tangibly included in a machine-readable medium such as storage unit 808. In some embodiments, part or all of the computer program may be loaded into and/or installed onto device 800 via ROM 802 and/or communication unit 809. When the computer program is loaded to RAM 803 and performed by CPU 801, one or more actions in methods 300, 400, and/or 700 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (for example, light pulses passing through fiber-optic cables), or electrical signals transmitted through electrical wires.

The computer-readable program instructions described herein can be downloaded from the computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block in the flow charts and/or block diagrams as well as a combination of blocks in the flow charts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in a sequence different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, comprising:
in response to migration of data from a source storage system to a target storage system, if it is determined that a target client terminal that uses the source storage system to back up data generates data to be backed up, determining whether an amount of data stored in the target storage system for the target client terminal exceeds a threshold; and
if it is determined an amount of data exceeds the threshold, storing the data to be backed up into the target storage system.

2. The method according to claim 1, further comprising:
determining, based on target historical backup information related to the target client terminal in the source storage system, respective priorities of a plurality of data blocks in backed-up data of the target client terminal stored in the source storage system; and
if it is determined that a first priority of a first data block in the plurality of data blocks is higher than a predetermined level and a second priority of a second data block in the plurality of data blocks is lower than the predetermined level, storing the first data block into the target storage system prior to the second data block.

3. The method according to claim 2, wherein the respective priorities of the plurality of data blocks are determined based on respective repetition rates of the plurality of data blocks in the source storage system.

4. The method according to claim 2, wherein the respective priorities of the plurality of data blocks are determined based on respective repetition rates of the plurality of data blocks in the source storage system and respective time periods in which the data blocks are repeatedly stored.

5. The method according to claim 2, further comprising:
storing the second data block in the target storage system during an idle time of the source storage system and the target storage system.

6. The method according to claim 1, further comprising:
if it is determined that the amount of data is lower than the threshold, storing the data to be backed up into the source storage system.

7. The method according to claim 1, further comprising:
for a plurality of client terminals that use the source storage system to back up data, sorting the plurality of client terminals based on respective data repetition rates and respective time windows of the plurality of client terminals, wherein the respective time windows indicate frequencies at which the plurality of client terminals respectively back up data in the source storage system; and
sequentially storing the backed-up data for the plurality of client terminals in the source storage system into the target storage system based on the sorting.

8. An electronic device, comprising:
at least one processor; and
at least one memory storing computer program instructions, which when executed by the at least one processor, cause the electronic device to perform actions comprising:
in response to migration of data from a source storage system to a target storage system, if it is determined that a target client terminal that uses the source storage system to back up data generates data to be backed up, determining whether an amount of data stored in the target storage system for the target client terminal exceeds a threshold; and
if it is determined that an amount of data exceeds the threshold, storing the data to be backed up into the target storage system.

9. The electronic device according to claim 8, wherein the actions further comprise:
determining, based on target historical backup information related to the target client terminal in the source storage system, respective priorities of a plurality of data blocks in backed-up data of the target client terminal stored in the source storage system; and
if it is determined that a first priority of a first data block in the plurality of data blocks is higher than a predetermined level and a second priority of a second data block in the plurality of data blocks is lower than the predetermined level, storing the first data block into the target storage system prior to the second data block.

10. The electronic device according to claim 9, wherein the respective priorities of the plurality of data blocks are determined based on respective repetition rates of the plurality of data blocks in the source storage system.

11. The electronic device according to claim 9, wherein the respective priorities of the plurality of data blocks are determined based on respective repetition rates of the plurality of data blocks in the source storage system and respective time periods in which the data blocks are repeatedly stored.

12. The electronic device according to claim 9, wherein the actions further comprise:
storing the second data block in the target storage system during an idle time of the source storage system and the target storage system.

13. The electronic device according to claim 8, wherein the actions further comprise:
if it is determined that the amount of data is lower than the threshold, storing the data to be backed up into the source storage system.

14. The electronic device according to claim 8, wherein the actions further comprise:

for a plurality of client terminals that use the source storage system to back up data, sorting the plurality of client terminals based on respective data repetition rates and respective time windows of the plurality of client terminals, wherein the respective time windows indicate frequencies at which the plurality of client terminals respectively back up data in the source storage system; and sequentially storing the backed-up data for the plurality of client terminals in the source storage system into the target storage system based on the sorting.

15. A computer program product tangibly stored on a non-volatile computer-readable medium and comprising machine-executable instructions, which when executed by a processor, cause the processor to perform actions, the actions comprising:

in response to migration of data from a source storage system to a target storage system, if it is determined that a target client terminal that uses the source storage system to back up data generates data to be backed up, determining whether an amount of data stored in the target storage system for the target client terminal exceeds a threshold; and if it is determined that an amount of data exceeds the threshold, storing the data to be backed up into the target storage system.

16. The computer program product according to claim 15, wherein the actions further comprise:

determining, based on target historical backup information related to the target client terminal in the source storage system, respective priorities of a plurality of data blocks in backed-up data of the target client terminal stored in the source storage system; and if it is determined that a first priority of a first data block in the plurality of data blocks is higher than a predetermined level and a second priority of a second data block in the plurality of data blocks is lower than the predetermined level, storing the first data block into the target storage system prior to the second data block.

17. The computer program product according to claim 16, wherein the respective priorities of the plurality of data blocks are determined based on respective repetition rates of the plurality of data blocks in the source storage system.

18. The computer program product according to claim 16, wherein the respective priorities of the plurality of data blocks are determined based on respective repetition rates of the plurality of data blocks in the source storage system and respective time periods in which the data blocks are repeatedly stored.

19. The computer program product according to claim 16, wherein the actions further comprise:

storing the second data block in the target storage system during an idle time of the source storage system and the target storage system.

20. The computer program product according to claim 15, wherein the actions further comprise:

if it is determined that the amount of data is lower than the threshold, storing the data to be backed up into the source storage system.

* * * * *

UNITED STATES PATENT AND TRADEMARK OFFICE
CERTIFICATE OF CORRECTION

| | | |
|---|---|---|
| PATENT NO. | : 11,340,825 B1 | Page 1 of 1 |
| APPLICATION NO. | : 17/184021 | |
| DATED | : May 24, 2022 | |
| INVENTOR(S) | : Yi Wang and Bing Liu | |

It is certified that error appears in the above-identified patent and that said Letters Patent is hereby corrected as shown below:

In the Claims

In Claim 1, Column 13, Line 37, delete "determining whether an amount of data stored" and insert --determining whether the amount of data stored--.

In Claim 1, Column 13, Line 40-41, delete "if it is determined an amount of data exceeds the threshold." and insert --if it is determined that the amount of data exceeds the threshold--.

In Claim 8, Column 14, Line 27, delete "determining whether an amount of data stored" and insert --determining whether the amount of data stored--.

In Claim 8, Column 14, Line 30, delete "if it is determined that an amount of data" and insert --if it is determined that the amount of data--.

In Claim 15, Column 15, Line 22, delete "determining whether an amount of data stored" and insert --determining whether the amount of data stored--.

In Claim 15, Column 15, Line 25, delete "if it is determined that an amount of data" and insert --if it is determined that the amount of data--.

Signed and Sealed this
Twenty-sixth Day of March, 2024

*Katherine Kelly Vidal*

Katherine Kelly Vidal
*Director of the United States Patent and Trademark Office*